(12) United States Patent
Rivera (10) Patent No.: US 11,369,226 B2
(45) Date of Patent: *Jun. 28, 2022

(54) BEVERAGE BREWING MATERIAL SUPPORT

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,889

(22) Filed: Dec. 19, 2017

(65) Prior Publication Data

US 2018/0110356 A1    Apr. 26, 2018

Related U.S. Application Data (63) Continuation-in-part of application No. 11/392,893, filed on Mar. 28, 2006, now Pat. No. 10,111,553.

(60) Provisional application No. 60/594,972, filed on May 23, 2005.

(51) Int. Cl.
| | |
|---|---|
| *B65B 29/02* | (2006.01) |
| *B65D 85/804* | (2006.01) |
| *A47J 31/08* | (2006.01) |
| *A47J 31/44* | (2006.01) |
| *A47J 31/057* | (2006.01) |

(52) U.S. Cl.
CPC ............ *A47J 31/08* (2013.01); *A47J 31/057* (2013.01); *A47J 31/44* (2013.01); *B65B 29/02* (2013.01); *B65B 29/025* (2017.08); *B65D 85/8043* (2013.01)

(58) Field of Classification Search
CPC ......... A47J 31/057; A47J 31/10; B65B 29/02; B65B 29/022; B65B 85/8043; B65B 85/8046; B65D 85/8043; B65D 85/8046

USPC ....... 99/304, 306, 295; 426/77, 82; 210/495, 210/482; 53/134.2, 134.1, 135.1, 409, 53/429, 464, 460, 410

See application file for complete search history.

(56) References Cited

U.S. PATENT DOCUMENTS

| | | | | |
|---|---|---|---|---|
| 739,470 | A * | 9/1903 | Wegner | ............................ 99/295 |
| 2,234,397 | A * | 3/1941 | Bentz | ....................... A47J 31/06 |
| | | | | 210/455 |
| 2,242,684 | A * | 5/1941 | Stuart | ..................... A21B 3/131 |
| | | | | 220/639 |
| 2,407,118 | A * | 9/1946 | Waters | .................... A21B 3/131 |
| | | | | 126/390.1 |
| 4,221,670 | A * | 9/1980 | Ziemek | ............... A47J 31/0626 |
| | | | | 210/474 |

(Continued)

*Primary Examiner* — Reginald Alexander
(74) *Attorney, Agent, or Firm* — IP Strategies (57) ABSTRACT

A method of manufacturing a support element for beverage brewing material includes providing water-permeable material to form a concave holder configured to receive the material, with a rim formed around an upper periphery. The method can include providing the material with fold lines, forming the holder from a single piece of the material, and shaping the holder into an open state. Preparing a beverage includes unfolding the support element to form a receptacle, adding the brewing material to an interior, and providing a flow of fluid through the material. An empty container includes filter material formable as a receptacle having has a bottom and sidewalls with folds defining an interior, and a rim at a top edge. The receptacle has a circular cross-section and a diameter of between about 30 mm and about 50 mm and/or a depth of between about 1 mm and about 15 mm.

21 Claims, 6 Drawing Sheets

(56) References Cited

U.S. PATENT DOCUMENTS

| | | | | |
|---|---|---|---|---|
| 4,396,655 A * | 8/1983 | Graham | ............... | B65D 51/20 |
| | | | | 428/34.4 |
| 4,550,024 A * | 10/1985 | le Granse | ............... | A47J 31/02 |
| | | | | 426/112 |
| 5,298,267 A * | 3/1994 | Gruenbacher | ..... | B65D 85/8043 |
| | | | | 206/5 |
| 5,897,899 A * | 4/1999 | Fond | ............... | B65D 85/8043 |
| | | | | 426/112 |
| 6,138,551 A * | 10/2000 | Bauer | ............... | A47J 31/02 |
| | | | | 426/82 |
| 6,189,438 B1 * | 2/2001 | Bielfeldt | ............... | A47J 31/08 |
| | | | | 210/493.5 |
| 6,662,955 B1 * | 12/2003 | Lassota | ............... | A47J 31/002 |
| | | | | 210/482 |
| 6,832,542 B2 * | 12/2004 | Hu | ............... | A47J 31/0668 |
| | | | | 99/295 |
| 2004/0005384 A1 * | 1/2004 | Cai | ............... | A47J 31/0647 |
| | | | | 426/77 |

* cited by examiner

BEVERAGE BREWING MATERIAL SUPPORT

CROSS-REFERENCE TO RELATED APPLICATIONS

This is a continuation-in-part of co-pending U.S. patent application Ser. No. 11/392,893, which was filed on Mar. 28, 2006 and which in turn claims the benefit of priority under 35 U.S.C. § 119(e) of U.S. Provisional Application for Patent No. 60/594,972, which was filed on May 23, 2005, the entire disclosure of which is incorporated herein.

FIELD OF THE INVENTION

The invention generally relates to systems and methods for forming pre-packaged beverage brewing material such as coffee or tea pods and packets and to other elements used to support beverage brewing material during the brewing process, including a lightweight and compact system configured for individual personal use in making coffee and/or tea pods and an element configured to provide support for beverage brewing material during the brewing process.

BACKGROUND OF THE INVENTION

Beverage pods generally refer to pre-packaged beverage brewing material such as coffee or tea that is sealed inside an enclosure that is formed at least in part from a fluid-permeable material. The pods are typically configured to be placed in a beverage brewing machine such that hot water is filtered through the pod to brew the beverage. In recent years, pod-based brewing systems have gained popularity as they are convenient to use and require very little cleaning up. Coffee pods, for example, typically contain a pre-measured amount of ground coffee sealed inside a disc-shaped package formed of filter paper and can be conveniently removed and disposed of when the brewing is finished.

However, one drawback associated with using a pod-based brewing system is that the choice of coffee in pod form is usually limited to the selections provided by pod manufacturers. Consequently, coffee drinkers are generally limited to the types of coffee sold in pod form that are available in the stores. Additionally, coffee connoisseurs often prefer grinding the coffee right before it is brewed in order to preserve aromatics of the coffee for the brewing process. Pre-packaged coffee pods sold in the stores could be viewed as not as fresh by some coffee drinkers who prefer freshly ground coffee. Further, some consumers would like to use the beverage brewers to brew beverages that are not available in pod form at all, such as herbal drinks or hot cocoa.

In view of the foregoing, it is apparent that there is a need for individual consumers to have more choices in the types of coffee or other beverage that can be made using pod-based brewing systems. To this end, there is a particular need for a device and method that would allow individuals to easily and conveniently form custom pods containing brewing material of their choice. Alternatively, such consumers could be served through the use of a beverage brewing material support element that is not an enclosed and sealed pod at all but would otherwise support beverage brewing material during the brewing process, whether in a beverage brewing machine that typically brews beverages from pods or otherwise brews beverages using brewing material through which fluid is passed.

SUMMARY OF THE INVENTION

As used herein, the term "pod" shall mean a package formed at least in part of a fluid-permeable material and containing an amount of ground beverage brewing material, such as coffee, therein. A pod that is formed is a pod that is ready to be used for brewing in a beverage brewing machine. A pod that is unformed or partially formed includes at least some pod elements according to any particular examples described herein, and is not necessarily sealed, filled, covered, or completely enclosing beverage brewing material within.

Exemplary embodiments of the personal pod-making system have several features, no single one of which is solely responsible for their desirable attributes. Without limiting the scope of this invention, its more prominent features will be discussed. However, not all of the following features are necessary to achieve the advantages of the system. Therefore, none of the following features should be viewed as limiting. After considering this discussion, and particularly after reading the detailed description of the invention, one will understand how the features of the preferred embodiments differ from and provide advantages over those of conventional systems.

One such advantage is the light weight and portability of the system. The system is designed for personal use and is simple to operate and maintain. Another advantage is the incorporation of a novel pod-package assembly that facilitates alignment and sealing of the pod and which requires substantially less user adjustment and manipulation as compared to conventional pod-package material. The resulting pod or other brewing material support allows any selected brewing material to be used, in a customized selected amount, from brewing material that has been freshly ground, if desired.

According to an aspect of the invention, a compact and lightweight pod-making system includes a base and a sealing tool that is pivotally coupled to the base. The base has a receptacle that is configured to receive at least a portion of a pod-packaging material. The pod-packaging material has a lower portion and an upper portion. The sealing tool has a heat-sealing surface that is configured to contact the upper portion of the pod-packaging material and apply heat thereto when the lower portion of the pod-packaging material is positioned in the receptacle of the base and when the sealing tool is pivoted toward the base. Preferably, the receptacle has an inner diameter of between about 30 mm and about 80 mm, and a depth of between about 1 mm and about 15 mm. In an exemplary embodiment, the heat-sealing surface is substantially circular and has a diameter of about 75 mm. The system optionally can include a receptacle size adjuster that is configured to increase or reduce the diameter of the receptacle. The system can be powered by battery or by an external power source. The base of the system can optionally include a support tray having one or more receptacles, and an alignment system configured to facilitate alignment of the receptacles with the sealing tool. Preferably, the pod-making system is portable and weighs less than 25 pounds.

According to another aspect of the invention, a packaging material for forming beverage pods includes a receptacle having a base and a sidewall extending upward from the base. The receptacle has an upper opening defined by an upper portion of the sidewall. The packaging material further includes a cover that is hingedly attached to the receptacle, and the cover is configured to cover the upper opening of the receptacle. Preferably, the receptacle and the cover are made of water-permeable material.

According to yet another aspect of the invention, a pod-package assembly includes a lower portion, which is configured to receive and hold an amount of ground beverage brewing material, and an upper portion that is coupled to the lower portion in a manner such that the upper portion is pivotable relative to the lower portion. Preferably, the upper portion is configured to enclose the ground brewing material held in the lower portion. The lower portion can have, for example, a frustoconical shape. The lower portion can have an annular rim that is configured to form a seal with the upper portion. Preferably, the lower portion has a diameter of between about 30 mm and about 80 mm.

According to yet another aspect, the invention includes a method of manufacturing a package assembly for forming beverage pods. A lightweight and water-permeable material is provided and processed to form two substantially circular portions that are hingedly connected to each other. One of the portions is configured to receive and hold a brewable material such as ground coffee. For example, the material can be processed at least in part by die-cutting the material. Two separate circular portions can be formed and connected together using an adhesive, or the circular portions can be integrally formed. A heat-activated adhesive can be applied to the periphery of the circular portions.

According to another aspect of the invention, a method of manufacturing a support element for beverage brewing material includes providing water-permeable material, and forming a holder from the water-permeable material. The holder is shaped into a generally concave shape such that the holder is configured to receive and support the beverage brewing material. An outward-extending rim is formed around an upper periphery of the concave shape of the holder.

The upper periphery of the holder can be substantially circular. The rim can be, for example, an annular rim. Preferably, the holder is generally flat before the holder is shaped. Providing the water-permeable material can include providing a single piece of the water-permeable material, and forming the holder from the water-permeable material can include forming the holder from the single piece of the water-permeable material. The generally concave shape can, for example, have a generally flat bottom, and a sidewall extended upward from a periphery of the bottom and having an upper edge defining the upper periphery. The bottom can be a generally circular bottom and the upper edge can be a generally circular upper edge. For example, the generally concave shape can be a generally frustoconical shape. The rim can be formed to extend generally parallel to the bottom.

According to another aspect of the invention, a method for forming a support element for beverage brewing material includes providing water-permeable material having fold lines, forming a holder from a single piece of the water-permeable material, shaping the holder into a concave open state having a generally circular upper periphery, and forming an outward-extending annular rim at the upper periphery of the holder.

The upper periphery of the holder can have a substantially circular shape. In the open state, the holder can have a generally frustoconical shape with a generally circular, flat bottom, and a sidewall extended upward from a periphery of the bottom to the annular rim. The holder can be collapsed along the fold lines from the open state into a closed state in which the holder assumes a generally flat configuration.

Another aspect of the invention is a support element for beverage brewing material formed by any of the methods described above.

According to another aspect of the invention, preparing a brewed beverage by a user includes unfolding the support element described above into the open state to form a receptacle for the beverage brewing material, adding the beverage brewing material to an interior volume of the support element, positioning the support element in a beverage maker, and providing a flow of fluid through the beverage brewing material to produce the brewed beverage.

According to another aspect of the invention, an empty container includes water-permeable filter material. In an unformed state, the filter material is generally flat. In a formed state, the filter material is shaped as a receptacle configured to hold beverage brewing material. The receptacle includes a concave cup and an outward-extending annular rim. The concave cup has a bottom and a sidewall defining an interior of the concave cup. The sidewall includes folds that enable transition between the unformed and formed states. The annular rim at least partially surrounds a top edge of the sidewall of the concave cup. The receptacle has a circular cross-section and a diameter of between about 30 mm and about 50 mm.

The filter material can be a single sheet of filter material. The annular rim can be arranged to extend substantially perpendicular to the top edge of the sidewall. In the unformed state, the filter material can have a generally circular cross-section.

According to another aspect of the invention, an empty container includes water-permeable filter material. In an unformed state, the filter material is generally flat. In a formed state, the filter material is shaped as a receptacle configured to hold beverage brewing material. The receptacle includes a concave cup and an outward-extending annular rim. The concave cup has a bottom and a sidewall defining an interior of the concave cup. The sidewall includes folds that enable transition between the unformed and formed states. The annular rim at least partially surrounds a top edge of the sidewall of the concave cup. The receptacle has a circular cross-section. The concave cup has a depth of between about 1 mm and about 15 mm.

The filter material can be a single sheet of filter material. The annular rim can be arranged to extend substantially perpendicular to the top edge of the sidewall. In the unformed state, the filter material can have a generally circular cross-section.

DETAILED DESCRIPTION OF THE INVENTION

Figure 1:
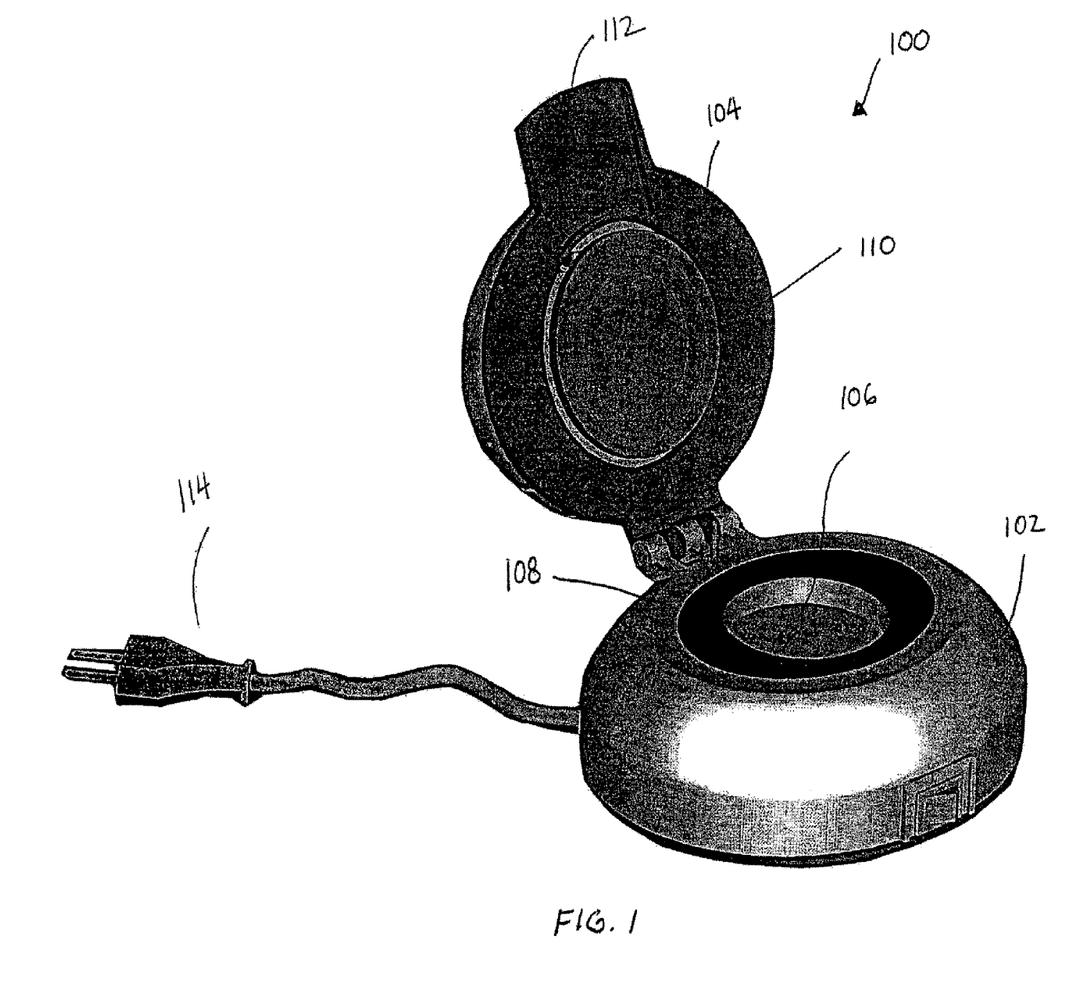
FIG. 1 is a schematic illustration of an exemplary lightweight and portable personal coffee pod-making system according to the invention.

An exemplary embodiment of a lightweight and portable personal pod-making system 100 having features and advantages in accordance with the present invention is illustrated in FIG. 1. While the described exemplary embodiment is a system designed for making pods containing ground coffee, it will be apparent to those of skill in the art that the invention can be applied to forming pods containing other types of pre-packaged brewing material such as tea or other beverage brewing material.

As shown in FIG. 1, the personal pod-making system 100 generally includes a base 102 configured to support pod-package material, and a sealing tool 104 that is pivotally coupled to the base 102. Preferably, the base 102 has a receptacle 106 configured to receive a sealable pod-packaging material such as conventional disc-shaped filter papers used for forming coffee pods. In an exemplary embodiment, the receptacle 106 has a circular cross-section with an inner diameter of between about 30 mm and about 80 mm and a depth of between about 1 mm and about 15 mm. However, the inner diameter and depth of the receptacle 106 can vary to correspond to the dimensions of various filter papers or the like that are suitable for use as pod-packaging material. The receptacle 106 can also be designed with various other cross-sectional shapes such as square, triangular, or oval. As described in greater detail below, the receptacle 106 is preferably configured so that disc-shaped pod-package material such as filter paper can be seated snugly in the receptacle with the rim portions of the pod-packaging material extending outward from the receptacle and disposed around the periphery of the receptacle.

In certain exemplary embodiments, the system 100 also includes a receptacle-size adjuster 108, preferably in the form of an annular ring as shown in FIG. 1. The receptacle-size adjuster 108 is removable and can be placed in the receptacle to adjust the inner diameter of the receptacle so as to accommodate for pod-packaging materials of various sizes. The receptacle size adjuster 108 can be made from any of a number of various materials including silicone, rubber, and/or metal. In one embodiment, the receptacle-size adjuster 108 has a width of about 50 mm and is configured to adjust the diameter of the receptacle 106 from about 80 mm to about 30 mm. Other sizes of adjusters providing other levels of adjustment are contemplated for use within the scope of the invention.

As also illustrated in in FIG. 1, the sealing tool 104 has a generally annular sealing surface 110 and a handle 112 extending therefrom. The handle 112 is designed to facilitate pivoting the sealing tool 104 relative to the base 102 and pressing the heated sealing surface 110 against the pod-packaging material to seal the pod. In the exemplary embodiment, the sealing surface 110 is arranged in a circular pattern and has a diameter of about 75 mm. Heating elements and the like can be positioned under the sealing surface 110 as a source of heat. As described in greater detail below, in operation, the sealing tool 104 can be manually or automatically extended downward so that the sealing surface 110 engages with the base 102 in a manner such that the heated sealing surface 110 presses against the periphery or annular rim of the pod-packaging material and seals the pod. For example, the sealing tool 104 can be electrically heated to a temperature ranging between about 130 degrees F. and about 250 degrees F. Preferably, the personal pod-making system 100 is generally made of a lightweight material such as plastic so that it is portable and weighs less than about 25 lbs., and preferably less than 10 lbs. The system 100 can be powered by an external source via an electrical plug 114 or by batteries installed in the system.

Figure 2A:
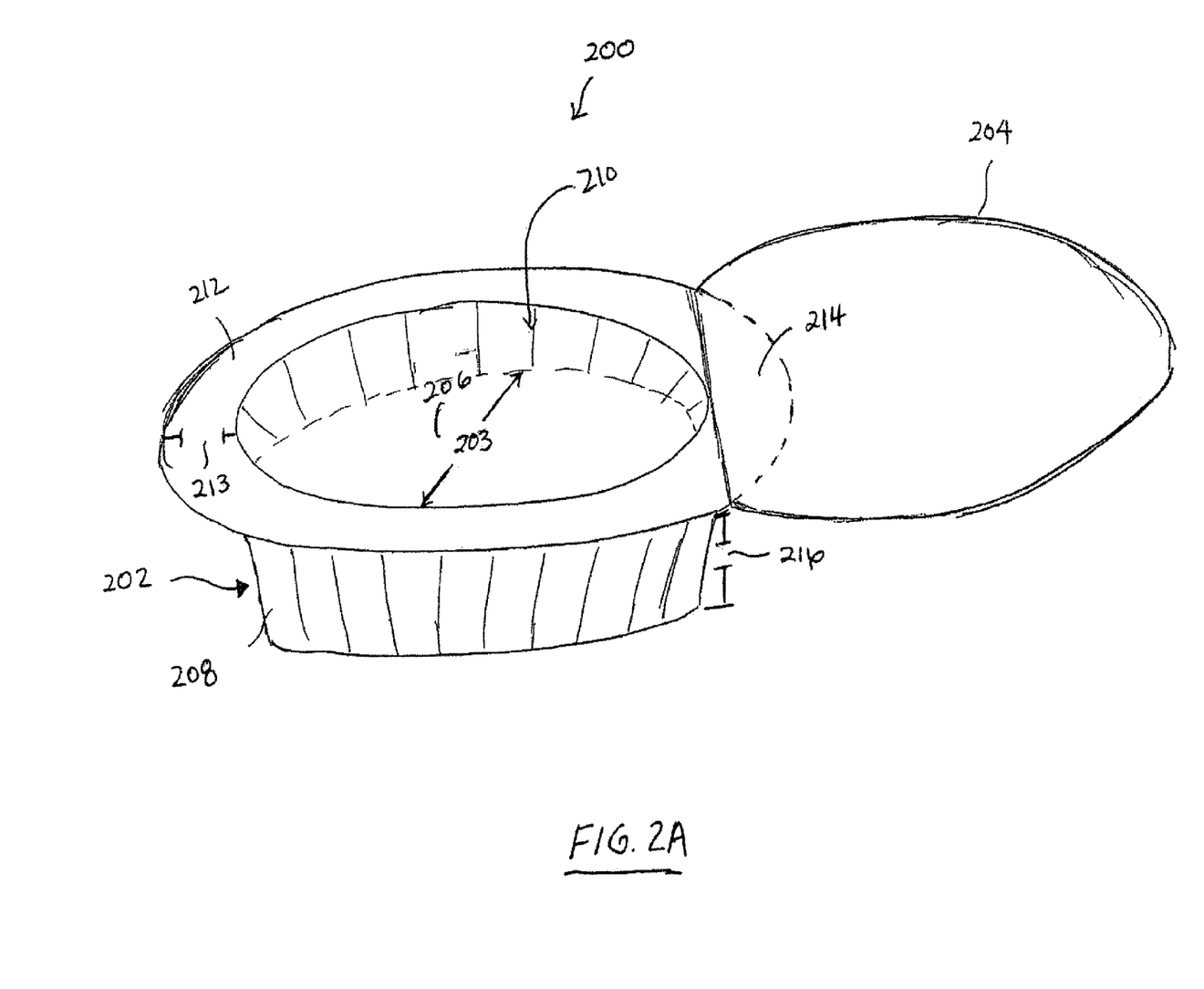
FIGS. 2A-2C illustrate embodiments of a pod-packaging assembly that can be used in conjunction with the system of FIG. 1.
Figure 2B:
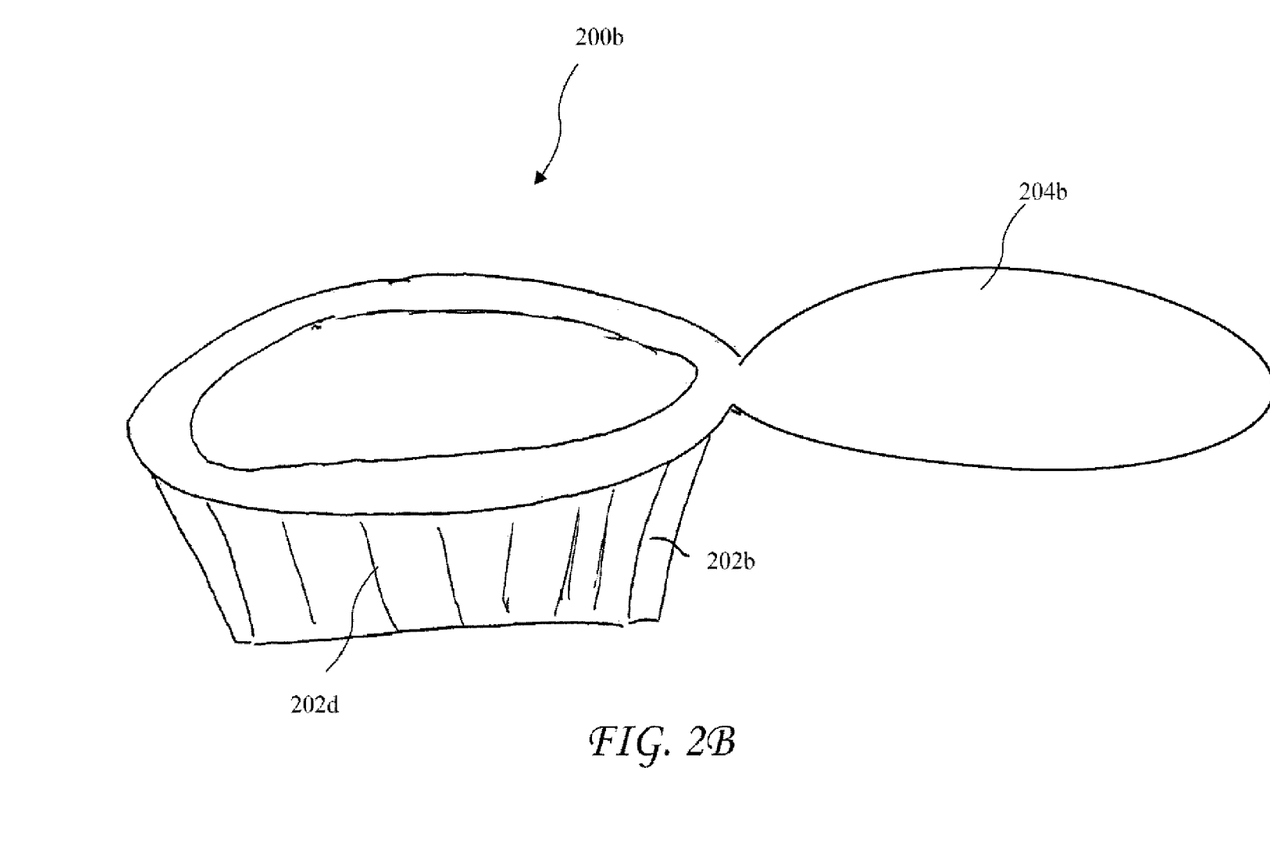
Figure 2C:
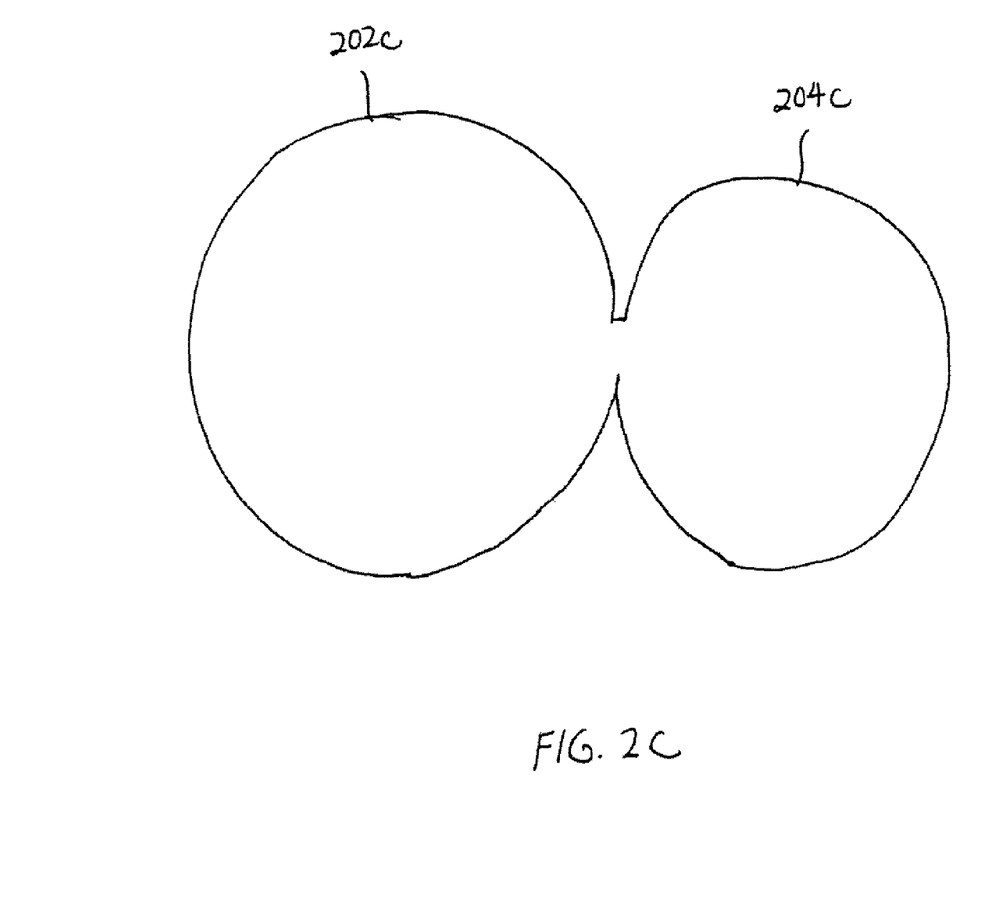

FIGS. 2A-2C illustrate exemplary embodiments of a novel pod-package assembly 200 that can be used in conjunction with the pod-making system 100 of FIG. 1. As shown in FIG. 2A, the pod-package assembly 200 includes a cup-shaped (concave) holder 202 configured to receive a measured amount of ground coffee or other beverage brewing material, and a hinged cover 204 configured to enclose the ground coffee in the holder 202. Preferably, the holder 202 has a circular base 206 and a sidewall 208 extending upward substantially perpendicular from the base 206 to define an upper opening 210. Preferably, the holder 202 has an inner diameter 203 of between about 30 mm and about 80 mm and the sidewall 208 of the holder has a height 216 of about 1 mm to about 15 mm. The holder 202 also includes an annular rim 212 extending from the upper opening 210. Preferably, the annular rim 212 has a width 213 of between about 2 mm and about 6 mm. The hinged cover 204 is coupled to the annular rim 212 and preferably has a diameter of between about 60 mm and about 80 mm. Preferably, the holder 202 and the hinged cover 204 are pivotally connected at a juncture 214. For example, the juncture 214 can be disposed along a portion of the annular rim 212 of the holder. Preferably, the juncture 214 makes up about 5 percent to 25 percent of the circumference of the cover.

Preferably, the holder 202 and the cover 204 of the pod-package assembly 200 are made of a water-permeable material such as filter paper. In certain exemplary implementations, the sidewall 208 of the holder 202 has one or more folds formed therein or is corrugated so as to lend strength and rigidity to the structure of the holder 202. However, the sidewall can have a substantially smooth surface. Preferably, a heat-activated adhesive is applied to the periphery of the cover 204 and/or the annular rim 212 of the holder so that the periphery of the cover can be joined with the annular rim of the holder to form a seal between the cover and the holder.

The pod-package assembly 200 having the hinged cover 204 as described above advantageously facilitates alignment of the cover 204 to the holder 206. Instead of trying to position the cover carefully so that the periphery of the cover overlaps the annular rim, a user simply flips the cover over onto the periphery of the cover, which would be aligned by design with the annular rim of the holder. For example, the holder 202 can be pre-attached to the cover 204 at the juncture 214 using an adhesive or bonding agent. Alternatively, as shown in FIG. 2B, the holder 202b and the cover 204b can be integrally formed. For example, the pod-package assembly 200 can include a one-piece material such as filter paper that is die-cut into the hinged configuration as shown in FIG. 2B. Alternatively, the pod-package assembly 200 can include two circular portions 202c, 204c that are hingedly connected together as shown in FIG. 2C. Preferably, the first portion 202c includes a circular piece of filter paper 202c that is capable of serving as a supporting surface for ground coffee. Preferably, the second portion 204c includes a circular piece of filter paper 204c that is capable of serving as a cover that can be used to enclose the coffee. Preferably, the diameter of the first portion 202c is smaller than the diameter of the second portion 204c. While the exemplary pod-package assembly includes a holder that is hingedly connected to a cover, various other forms of pod-package assemblies including those in which the holder and the cover are not connected are also contemplated as being within the scope of the invention, as well as support structures that do not include a cover or are not covered.

Figure 3:
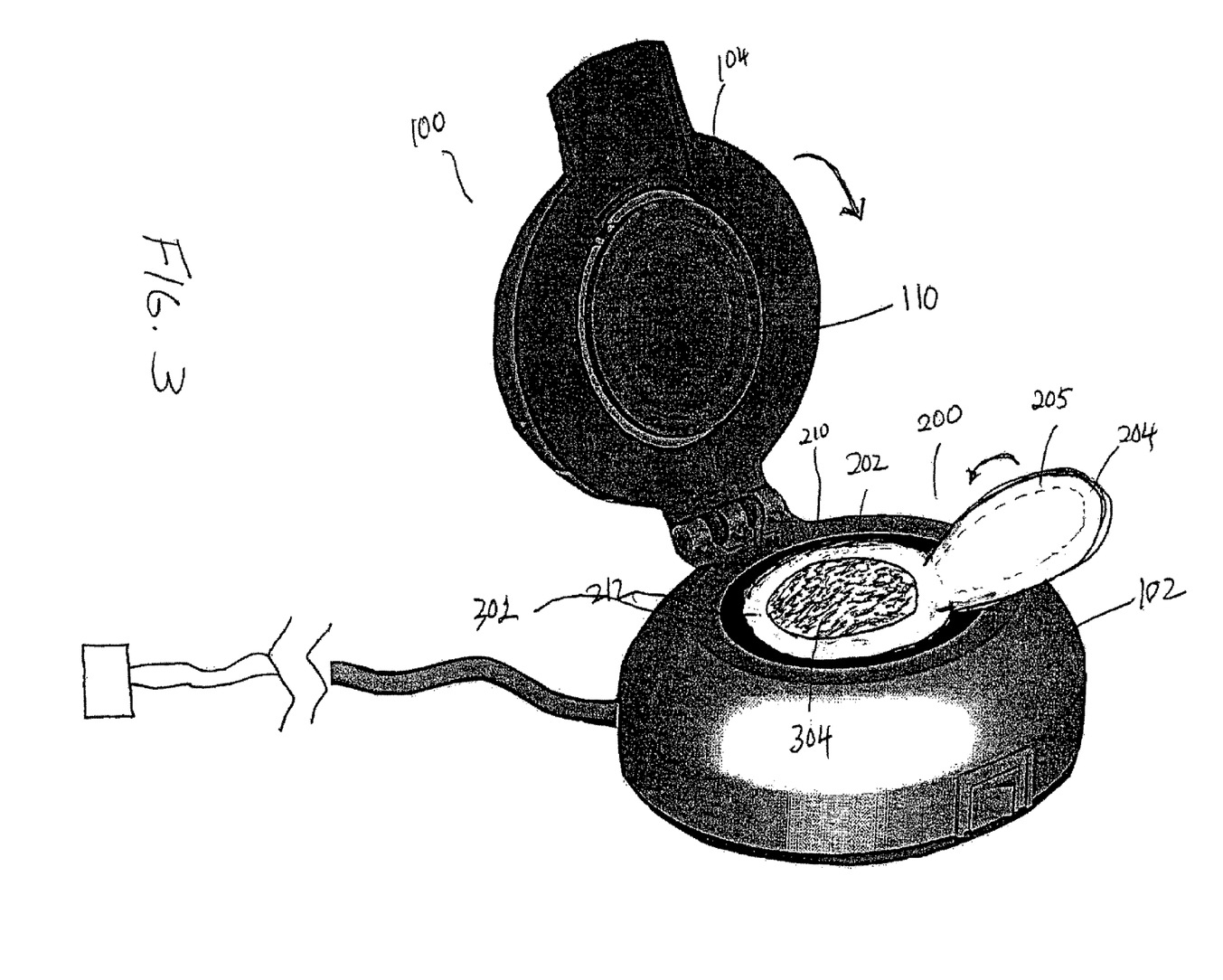
FIG. 3 illustrates an exemplary manner in which a coffee pod can be formed using the system of FIG. 1.

FIG. 3 illustrates the manner the pod-making system 100 of FIG. 1 can be used to form coffee, tea, or other beverage pods. As shown in FIG. 3, a pod-package assembly 200 such as that described above in FIG. 2A is placed in the receptacle of the pod-making system 100 so that the cup-shaped holder 202 is seated in the receptacle and the annular rim 212 is disposed adjacent an upper surface 302 of the base 102. An amount of ground coffee 304 or other beverage brewing material is placed in the holder 202. Subsequently, the cover 204 can be simply flipped over to cover the upper opening 210 of the holder 202. Because the cover 204 is hingedly connected to the holder 202, the periphery 205 of the cover 204 aligns with the annular rim 212 of the holder 202 without requiring much user manipulation. The sealing tool 104 is then pivoted toward the base 102 so that the heating surface 110 of the sealing tool 104 contacts the pod cover 204. When the heated sealing surface contacts the pod cover, the heat activates the adhesive on the annular rim of the cup-shaped holder 202 and/or the periphery 205 of the cover 204 to bond the cover to the holder so as to seal the pod and enclose the beverage brewing material. Additionally, while being pressed down on the base, force exerted on the sealing tool 104 can also serve to compress the ground coffee inside the pod-package assembly.

Figure 4:
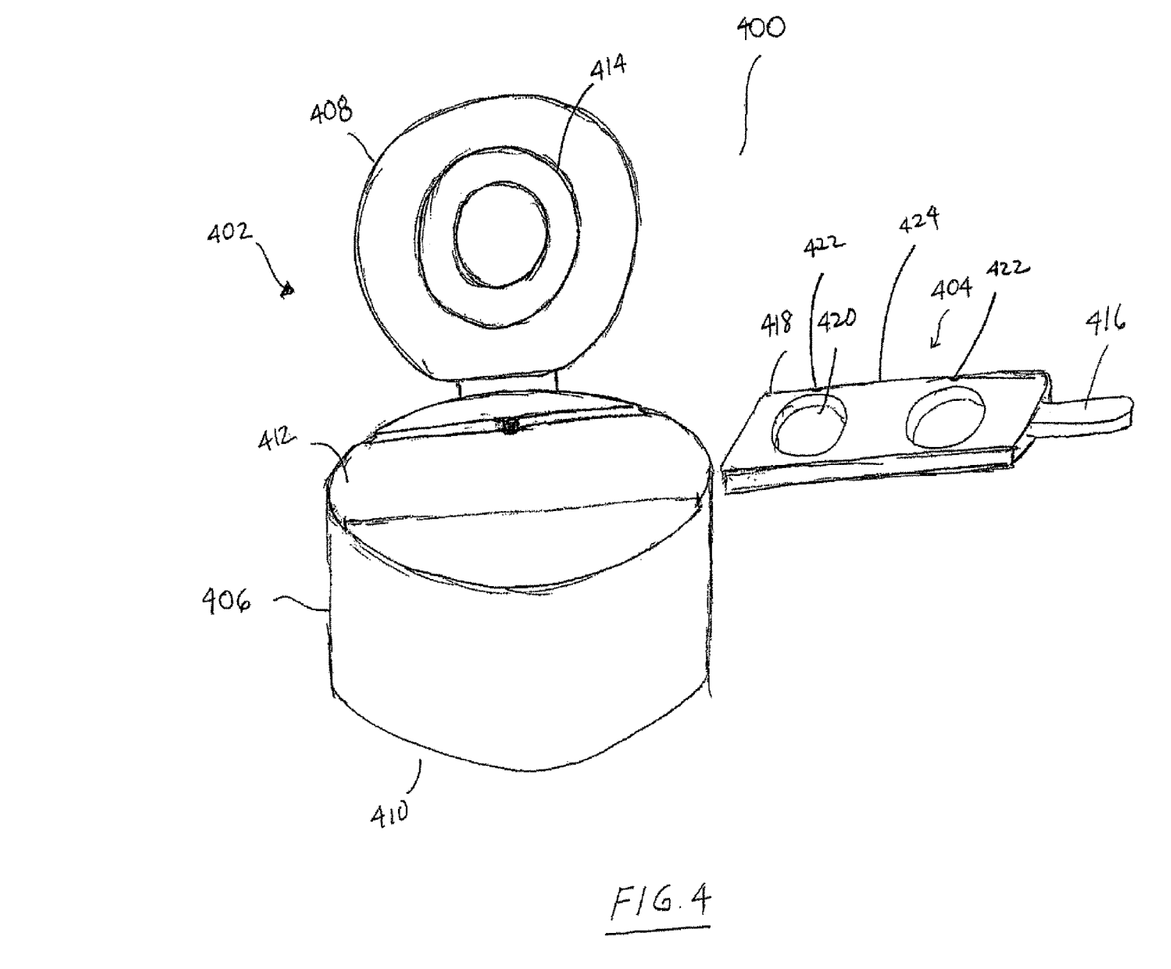
FIG. 4 is a schematic illustration of another exemplary embodiment of the pod-making system of the invention.

FIG. 4 shows an exemplary embodiment of the pod-making system 400 that generally includes a compact and lightweight sealing assembly 402 and a receptacle 404 configured to receive sealable packaging material such as filter papers designed for forming pods. In one embodiment, the sealing assembly 402 includes a base 406 and a heat sealer 408 pivotally coupled thereto. Preferably, the base 406 has a generally flat lower surface 410 configured to rest against a support surface such as a table top and a slotted upper surface 412 configured to slidingly engage with the support tray 404 in a manner described in greater detail below. As also shown in FIG. 4, the heat sealer 408 has a number of heating elements 414. Preferably, the heating elements 414 are arranged in a circular pattern and are dimensioned to correspond generally to the diameter of the packaging material. As described in greater detail below, each heat seal element 414 is configured to contact the periphery of a particular sized circular sealable packaging material to bond the material at selected areas along the periphery. The circular heat-seal elements 114 are configured to bond circular pod-package materials such as filter papers having diameters of 30 mm and 80 mm. The sealing assembly 402 can be powered by an external power source or can be powered by internal batteries.

As also illustrated in FIG. 4, the support tray 404 generally includes a handle 416, a rectangular body 418, and a plurality of receptacles 420 formed therein. Preferably, the support tray 404 is configured to slidingly engage with the slotted upper surface 412 of the sealing assembly 402. For example, a number of alignment slots 422 can be formed along one edge 424 of the support tray 404. The alignment slots 422 can be configured to couple with similar alignment slots formed along the slotted upper surface 412 of the sealing assembly 402. The alignment slot adjacent a receptacle is aligned with the alignment slot on the sealing assembly 402 to ensure that the packaging material in the receptacle is in alignment with the heat seal element 414. Preferably, the depth of each receptacle is such that when a circular filter paper is received in the receptacle a portion of the periphery of the filter paper is above the receptacle. Preferably, the support tray 404 has a width of about 70 mm, a length of about 210 mm, and a thickness of about 18 mm, although a tray having other suitable dimensions and even other shapes is contemplated as being within the scope of the invention. For example, the receptacles 420 in the support tray 404 can be circular and have, for example, a diameter of about 50 mm and a depth of about 1 mm to 15 mm. The tray can be coated with a non-sticking material such as polytetrafluorethylene or ceramic.

The personal pod-making system of the invention is a compact and lightweight system suitable for individual use to make custom beverage pods. The system is portable and thus allows users to make custom beverage pods at home, in the office, or even outdoors. Additionally, the invention is designed to facilitate alignment of the pod cover to the cup-shaped holder so as to reduce user handling and manipulation.

In general, a method of manufacturing a support element for beverage brewing material according to the invention includes forming a holder from water-permeable material. Preferably, the holder is shaped into a generally concave shape such that the holder is configured to receive and support the beverage brewing material. A rim is formed around an upper periphery of the concave shape of the holder. The concave shape of the holder of the support element allows the support element to receive and support the brewing material. The rim provides a surface to locate and secure the position of the support element within the brewing chamber of a beverage brewing machine.

The generally concave shape of the holder of the support element can take any of a number of forms, as long as the shape is configured such that it is able to receive and support the beverage brewing material. For example, the holder can have a generally flat or rounded bottom, and a sidewall extended upward from a periphery of the bottom and having an upper edge defining the upper periphery. The bottom can be generally circular and the upper edge can be generally circular. Thus, in this configuration, the shape can be generally cylindrical or generally frustoconical. Instead, the bottom can be pointed, so that the shape is conical, or the bottom can be rounded, or pleated in a line. The bottom and upper edge need not be circular, and can take any suitable shape. The rim can be formed general parallel to the bottom, generally perpendicular to the sidewall, or at an acute or obtuse angle with respect to the bottom and/or sidewall.

The holder can be substantially circular to fit most brewing chambers, or it can be shaped differently to suit the application or to facilitate manufacturing or shipping. The rim can be, for example, an annular rim, which can completely encompass the periphery or which can be broken into sections to partially or completely surround the periphery. Preferably, the holder is generally flat before the holder is shaped, or at least assumes a compact form that is more convenient for storage and shipping. Thus, before shaping, the holder preferably is not configured for receiving and supporting the brewing material or for use in the brewing chamber, and only the shaped (formed) holder is used in the brewing process.

Preferably, the water-permeable material used to form the holder is a single piece of water-permeable material. Using a single piece of the material simplifies the manufacturing process, minimizes costs, and reduces the chances of failure of the structure of the support element during use.

To facilitate transition between unformed/closed and formed/open states, the water-permeable material can have fold lines. From the closed, generally flat state, the material can be opened along the fold lines to shape the holder into the concave open state, and to form the rim at the upper periphery. During manufacturing, for shipping, for storage, or after use, the holder can be collapsed along the fold lines from the open state into a closed state in which the holder assumes a generally flat configuration. The receptacle, in both the unformed/closed and formed/open states, can be manufactured in any practical shape and size suitable for the intended brewing machine and for practical manufacture and packaging. For example, for use in a typical brewing machine, the receptacle can have a circular cross-section and a diameter of between about 30 mm and about 50 mm, with a depth of between about 1 mm and about 15 mm. Of course, other shapes, sizes, and dimensions are contemplated by the inventor as falling within the scope of the invention, in order to adapt the concept of the invention to various beverage makers having different dimensions and brewing different volumes of beverage, from single-cup servings to small carafes to multiple-cup pots.

When a user wants to brew a beverage according to the invention, he or she unfolds the support element described above into the open state to form an empty receptacle configured to receive the beverage brewing material. The user then adds the beverage brewing material of the user's choice to an interior volume of the support element in an amount that is suitable to the user's taste. The user then positions the support element containing the beverage brewing material in a beverage maker, typically within the brewing chamber of the beverage maker. The user then operates the beverage maker in order to provide a flow of fluid through the beverage brewing material to produce the desired brewed beverage. For example, the user can open the receptacle, deposit a measured amount of a selected type of ground coffee inside the receptacle, place the receptacle in the brewing chamber of, for example, a single-serving coffee maker, and then follow the operating instructions for the coffee maker to cause hot water to flow through the ground coffee in order to brew a coffee beverage. The brewed outflow can be directed, such as by the coffee maker, into a coffee cup or other drinking vessel.

The invention is intended to encompass the methods described herein, the support element for beverage brewing material formed by any of the methods described herein, and any reasonable apparent equivalents. To that end, the present invention has been described by way of example and in terms of preferred embodiments. However, the invention is not strictly limited to the particularly disclosed embodiments. To the contrary, various modifications, as well as similar arrangements, are included within the spirit and scope of the present invention as contemplated by the inventor. The scope of the appended claims, therefore, should be accorded the broadest reasonable interpretation so as to encompass all such modifications and similar arrangements.

I claim:

1. A method of manufacturing a support element for beverage brewing material, comprising:
   providing water-permeable material;
   forming a holder and a holder cover from the water-permeable material;
   shaping the holder into a generally concave shape such that the holder is configured to receive and support the beverage brewing material; and
   forming an outward-extending rim around an upper periphery of the concave shape of the holder;
   wherein the generally concave shape has a generally flat bottom, and a sidewall extended upward from a periphery of the bottom and having an upper edge defining the upper periphery; and
   wherein the holder cover is hingedly attached to the rim.

2. The method of claim 1, wherein the upper periphery of the holder is substantially circular.

3. The method of claim 2, wherein the rim is an annular rim.

4. The method of claim 1, wherein the holder is generally flat before the holder is shaped.

5. The method of claim 1, wherein:
   providing the water-permeable material includes providing a single piece of the water-permeable material; and
   forming the holder and the holder cover from the water-permeable material includes forming the holder from the single piece of the water-permeable material.

6. The method of claim 1, wherein the bottom is a generally circular bottom and the upper edge is a generally circular upper edge.

7. The method of claim 1, wherein the rim is formed generally parallel to the bottom.

8. The method of claim 1, further comprising applying a bonding agent to the rim, wherein the bonding agent is at least one of heat-activated and pressure-activated.

9. The method of claim 8, wherein the holder cover is configured to be bonded to the rim.

10. A method for forming a support element for beverage brewing material, comprising:
    providing water-permeable material having fold lines;
    forming a holder and a holder cover from a single piece of the water-permeable material;
    shaping the holder into a concave open state having a generally circular upper periphery; and
    forming an outward-extending annular rim at the upper periphery of the holder; and
    wherein, in the open state, the holder has a generally frustoconical shape with a generally circular, flat bottom, and a sidewall extended upward from a periphery of the bottom to the annular rim; and
    wherein the holder cover is hingedly attached to the rim.

11. The method of claim 10, wherein the upper periphery of the holder has a substantially circular shape.

12. A support element for beverage brewing material, formed by the method of claim 10.

13. The method of claim 10, further comprising collapsing the holder along the fold lines from the open state into a closed state in which the holder assumes a generally flat configuration.

14. A support element for beverage brewing material, formed by the method of claim 13.

15. Preparing a brewed beverage by a user, comprising:
    unfolding the support element of claim 13 into the open state to form a receptacle for the beverage brewing material;
    adding the beverage brewing material to an interior volume of the support element;
    positioning the support element in a beverage maker; and
    providing a flow of fluid through the beverage brewing material to produce the brewed beverage.

16. The method of claim 10, further comprising applying a bonding agent to the rim, wherein the bonding agent is at least one of heat-activated and pressure-activated.

17. The method of claim 16, wherein the holder cover is configured to be bonded to the rim.

18. An empty container, comprising:
    water-permeable filter material;
    wherein, in an unformed state, the filter material is generally flat;
    wherein, in a formed state, the filter material is shaped as a receptacle configured to hold beverage brewing material, wherein the receptacle includes
        a concave cup having a bottom and a sidewall defining an interior of the concave cup, wherein the sidewall includes folds that enable transition between the unformed and formed states,
        an outward-extending annular rim at least partially surrounding a top edge of the sidewall of the concave cup, a bonding agent applied to the rim, wherein the bonding agent is at least one of heat-activated and pressure-activated, and a cover;

wherein the receptacle has a circular cross-section;

wherein the concave cup has a depth of between about 1 mm and about 15 mm;

wherein, in the open state, the holder has a generally frustoconical shape with a generally circular, flat bottom, and a sidewall extended upward from a periphery of the bottom to the annular rim; and wherein the cover is hingedly attached to the rim.

19. The empty container of claim 18, wherein the annular rim extends substantially perpendicular to the top edge of the sidewall.

20. The empty container of claim 18, wherein, in the unformed state, the filter material has a generally circular cross-section.

21. The empty container of claim 18, wherein the cover is configured to be bonded to the rim.

* * * * *